United States Patent Office 3,403,195
Patented Sept. 24, 1968

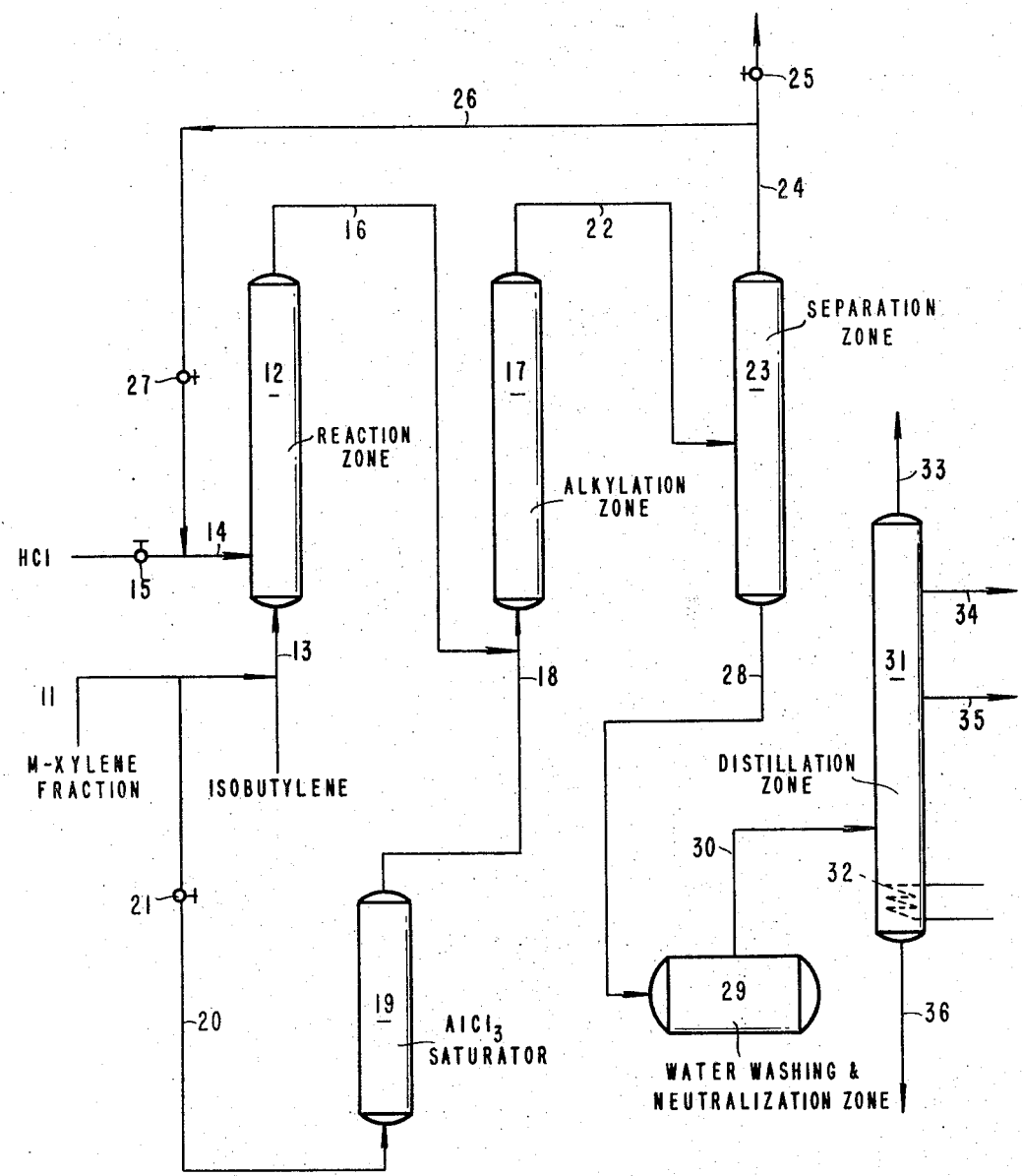

3,403,195
PREPARATION OF t-ALKYL BENZENE
Robert H. Patton, Baytown, Tex., and Robert H. Perry, Jr., Springfield, N.J., assignors to Esso Research and Engineering Company
Filed Aug. 5, 1966, Ser. No. 570,481
2 Claims. (Cl. 260—671)

ABSTRACT OF THE DISCLOSURE t-Butyl-m-xylene is produced by reacting isobutylene with hydrogen chloride dissolved in m-xylene to form t-butyl chloride free of isobutylene, the t-butyl chloride formed in situ then being employed to alkylate the m-xylene to form t-butyl-m-xylene and hydrogen chloride resulting in production of t-butyl chloride and hydrogen chloride in situ.

---

The present invention is directed to the preparation of t-alkyl benzene. More specifically, the invention is concerned with the preparation of a t-alkyl benzene in which the alkylation agent is produced in situ. In its more specific aspects, the invention is concerned with the preparation of t-butyl-m-xylene.

The present invention may be briefly described as a method of producing a t-alkyl benzene such as t-butyl-m-xylene in a reaction employing isobutylene, hydrogen chloride and a benzene or a benzene derivative such as m-xylene, as the sole feed stocks and wherein t-alkyl chloride, such as t-butyl chloride, is the sole alkylation agent. The method comprises reacting isobutylene with hydrogen chloride dissolved in a benzene derivative to form an aromatic product containing t-alkyl chloride and free of isobutylene. The aromatic product is then alkylated under alkylation conditions in the presence of a Friedel-Crafts catalyst to form an alkylated product containing the t-alkyl benzene and hydrogen chloride. The t-alkyl benzene and the hydrogen chloride are recovered with the hydrogen chloride being recycled for reaction with isobutylene. The t-alkyl benzene may be water washed, neutralized and recovered by distillation of the alkylated product.

In the present invention, t-alkyl chloride and hydrogen chloride are produced in situ and the formation of high boiling polymers of isobutylene is avoided and the production of high boiling alkyl monochlorides and polyolefins is reduced.

The present invention is applicable to alkylation of aromatic hydrocarbons such as benzene, toluene, xylene, the trimethylbenzenes, the ethylbenzenes, the tetramethylbenzenes and the like. The alkyl benzenes having from 1 to 16 carbon atoms in each alkyl group may be employed. The aromatic hydrocarbons may suitably be liquid or normally solid hydrocarbons.

In forming the t-butyl chloride, the isobutylene and hydrogen chloride are reacted at ambient temperatures in the absence of a catalyst to form t-butyl chloride in an aromatic hydrocarbon solvent which preferably may be the benzene hydrocarbon which is to be alkylated. The temperatures at which the t-butyl chloride is formed range from about 15° to about 30° C. with a preferred temperature being in the range from about 15° to 25° C.

Pressures for formation of the t-butyl chloride may range from about atmospheric to about 150 p.s.i. with a preferred pressure being in the range from about 100 to 120 p.s.i.

The alkylation reaction is suitably conducted at a temperature within the range from about 20° to about 45° C., with a preferred temperature being within the range from about 25° to about 35° C.

A Friedel-Crafts catalyst is used in the alkylation reaction and may be illustrated by the usual Friedel-Crafts catalysts such as aluminum chloride, boron trifluoride, titanium chlorides, trichlorides, hydrogen fluoride, phosphoric acid, silica-alumina, $AlX_3$, where X is a halogen, and the like. Aluminum chloride will be preferred and will be used in an amount from about 0.1% to about 5% by weight based on the aromatic hydrocarbon. A preferred amount may range from about 0.25% to about 2.5% by weight based on the aromatic hydrocarbon.

The amount of isobutylene used in forming the t-butyl chloride is an amount sufficient to provide an aromatic-to-olefinic ratio of about 0.5:1 to about 3:1.

The ratio of t-butyl chloride-to-benzene hydrocarbon may range from about 0.25:1 to about 1.25:1.

It is to be emphasized that the isobutylene should be used in an amount sufficient to react with all of the hydrogen chloride dissolved in the benzene hydrocarbon such that there is no free isobutylene present in the alkylation zone. Thus, the ratio of t-butyl chloride to m-xylene, when these materials are the reactants, should suitably be within the range from about 0.5:1 to about 1:1 although lesser or greater amounts may be used within the range given previously.

The present invention will be further illustrated by reference to the drawing in which the single figure is a flow diagram of a preferred mode and embodiment. Referring now to the drawing, a m-xylene fraction which may be substantially purified and containing about 99.5 to 99.95% m-xylene is introduced into the system by way of line 11 and thence introduced into a reaction zone 12 by way of line 13 in admixture with isobutylene introduced thereby. Hydrogen chloride is introduced into zone 12 by line 14 controlled by valve 15 which connects to a source of hydrogen chloride not shown and in reaction zone 12 under ambient temperature conditions the isobutylene reacts in the m-xylene solvent with the hydrogen chloride to form t-butyl chloride. Thus, a m-xylene product containing t-butyl chloride and free of isobutylene is discharged by line 16 into an alkylation zone 17 by way of line 18 wherein the m-xylene containing t-butyl chloride is admixed with a m-xylene stream containing aluminum chloride. The aluminum chloride containing stream is formed by introducing a portion of the m-xylene fraction of line 11 into an aluminum chloride saturator 19 by line 20 controlled by valve 21. Thus, as the m-xylene fraction flows through saturator 19 it dissolves aluminum chloride such that the stream in line 18 contains a catalytic amount of aluminum chloride to cause alkylation to occur in alkylation zone 17 between the t-butyl chloride and the m-xylene. During the reaction in alkylation zone 17, hydrogen chloride and t-butyl-m-xylene are produced and the product containing same is discharged from zone 17 by line 22 into a separation zone 23 from which the hydrogen chloride is discharged by line 24 containing valve 25. The hydrogen chloride in most or all part is recycled from line 24 by branch line 26 controlled by valve 27 to line 14 to serve as a source of hydrogen chloride in the reaction once the reaction is initiated. Thus, t-butyl chloride and hydrogen chloride are produced in situ.

The alkylated product discharges from separation zone 23 by way of line 28 into a water washing and neutralization zone 29 wherein the product is washed with water and neutralized with an aqueous solution of sodium hydroxide such as one containing from about 0.5% to about 2.0% sodium hydroxide or with ammonia or other neutralizing agents and the water-washed and neutralized product discharged by line 30 into drying means not shown and then into distillation zone 31 which is suitably a fractional distillation zone provided with internal vapor-liquid contacting means to allow separation of the t-butyl m-xylene from unreacted m-xylene and other materials. To this end, zone 31 is provided with a heating means illustrated by steam coil 32, line 33 for recovery of unreacted metaxylene, line 34 for recovery of t-butyl-m-xylene and line 35 for withdrawal of any heavier products. Bottoms may be discharged by line 36. Thus, in accordance with the present invention, hydrogen chloride, isobutylene and m-xylene form the sole feed stocks when t-butyl chloride is the alkylation agent and is produced in situ in the operation along with hydrogen chloride which is released in the reaction and is recycled.

t-Butyl chloride is a very expensive reagent and normally it would be expected that the employment of t-butyl chloride in an alkylation reaction to produce t-butyl-m-xylene would increase the cost of the process to such an extent as to make it impractical and uneconomical. Isobutylene is ordinarily employed as the alkylation agent, but isobutylene is objectionable in that under the conditions of alkylation polymerization also takes place with formation of high boiling polymers which react with hydrogen chloride present to form high boiling alkyl monochlorides. Also, the formation of polymers interferes with the desired alkylation reaction. Thus, in accordance with the present invention, hydrogen chloride is not consumed in the alkylation reaction and is recycled and the hydrogen chloride reacts rapidly and almost quantitatively with isobutylene. The invention is quite advantageous over the use of isobutylene in the alkylation in that when isobutylene is employed and conversion is increased, the alkylation of the aromatic compound is diminished in favor of the competing, polymerization reaction and the polymeric products interact either with m-xylene or with mono-t-butyl-m-xylene to give an alkylated xylene with a single, increasingly large side chain. Additionally, the polymerization of isobutylene lowers the isobutylene selectivity by removing the effective number of t-butyl groups available for alkylation. Both heavy alkylate and polyisobutylene are produced as undesirable products. Additionally, the polyolefins formed react with hydrogen chloride to give high molecular weight alkyl chlorides which are removed only with great difficulty in the product work-up and may crack at atmospheric pressure during distillation, thus giving rise to corrosion of the metal surfaces of the distillation equipment.

It has been found that the use of t-butyl chloride produced in situ leads to very high selectivity of the order of 98% even at 94% conversion of m-xylene. There is no interference and no loss of effective t-butyl groups by competing polymerization reactions since no olefin is present. The employment of t-butyl chloride produced in situ reduces the formation of polymers and of high boiling alkyl monochlorides which, as it has been mentioned, give rise to corrosion during distillation, since there is no polyisobutylene available for reaction with hydrogen chloride or to react as an alkylating agent.

In order to illustrate the invention further, runs were made at temperatures within the range from about 10° to about 40° C. using isobutylene as the alkylation agent with m-xylene. The results of these operations are shown in Table I.

TABLE I.—RESULTS USING ISOBUTYLENE

| Molar ratio, iC₄=/m-xylene | Yield (molar) | Percent, on m-xylene | |
|---|---|---|---|
| | | Conversion | Selectivity |
| 1/1 | 45 | 60 | 75 |
| 1.16/1 | 30 | 41 | 74 |
| 1.72/1 | 42 | 75 | 56 |
| 0.59/1 | 43 | 57 | 75 |
| 0.58/1 | 25 | 39 | 65 |

It will be seen from Table I that the conversions range from 41 to 75 at selectivities from 56 to 75. In contrast to these runs, other runs were made with t-butyl chloride. The results of these runs will be found in Table II.

TABLE II.—RESULTS USING t-BUTYL CHLORIDE

| Molar ratio, t-BuCl/m-xylene | Yield (molar) | Percent, on m-xylene | |
|---|---|---|---|
| | | Conversion | Selectivity |
| 0.5/1 | 53 | 56 | 94 |
| 0.5/1 | 51 | 54 | 94 |
| 0.53/1 | 43 | 46 | 95 |
| 1/1 | 92 | 94 | 98 |

On comparing the results of Table I with the results of Table II, it will be seen that conversions ranging from 46–94% were obtained at selectivities of 94–98% which is a surprising difference between using isobutylene and t-butyl chloride. Not only were high conversions and selectivities obtained, but t-butyl chloride allows the obtaining of higher purity products over that obtainable with isobutylene.

Table III shows the analysis of the product obtained by alkylating m-xylene with t-butyl chloride at a temperature from 25° to 27° C.

TABLE III.—ANALYSIS OF PRODUCT

| Component, wt. percent [1] | Feed | Total crude product |
|---|---|---|
| Unknown compounds lighter than TBMX | | 0.63 |
| Ethylbenzene | 1.6 | 0.03 |
| p-Xylene | 11.4 | 9.93 |
| m-Xylene | 86.3 | 38.82 |
| o-Xylene | 0.7 | 0.12 |
| m-Tert-butylethylbenzene | | 0.32 |
| 5-tert-butyl m-xylene | | 48.45 |
| p-Tert-butylethylbenzene | | 0.60 |
| 4-tert-butyl o-xylene | | 0.38 |
| Amyl-m-xylene | | 0.01 |
| Unknown compounds heavier than TBMX | | 0.71 |
| | 100.0 | 100.00 |

[1] By CGC.

In contrast with the data shown in Table III, a run was made with isobutylene as the alkylation agent at a temperature of 25° to 29° C. alkylating m-xylene. These results are shown in Table IV.

TABLE IV.—ANALYSIS OF PRODUCT

| Component, wt. percent | Feed | Total crude product |
|---|---|---|
| Unknown compounds lighter than TBMX | | 1.50 |
| Ethylbenzene | 1.6 | 0.24 |
| p-Xylene | 11.4 | 12.76 |
| m-Xylene | 86.3 | 53.91 |
| o-Xylene | 0.7 | 0.22 |
| m-Tert-butylethylbenzene | | 0.01 |
| 5-tert-butyl-m-xylene | | 17.97 |
| p-Tert-butylethylbenzene | | 0.24 |
| 4-tert-butyl-1-xylene | | 0.53 |
| Amyl-m-xylene | | 3.19 |
| Unknown compound heavier than TBMX | | 9.43 |
| | 100.0 | 100.00 |

It will be seen that from these runs comparing Tables III and IV the total product where t-butyl chloride was obtained contained about 48% of t-butyl-m-xylene against approximately 18% where isobutylene was employed at substantially the same temperature.

Moreover, the selectivity based on the m-xylene converted in Table III was over 95% against about 71% as shown in Table IV. Also, in Table III it will be seen that compounds heavier than t-butyl-m-xylene were only 0.71% against 9.43% as shown in Table IV. This illustrates that an unusual and unobvious result for employing t-butyl chloride over isobutylene is obtained in the practice of the present invention.

It is to be emphasized that in the present invention the sole feed stocks are the aromatic hydrocarbon, hydrogen chloride and isobutylene but isobutylene is not used directly as the alkylating agent, but is converted in situ to t-butyl chloride which is advantageously used as the sole alkylating agent to avoid the formation of polymers, alkyl monochlorides and to allow the production in situ of the alkylation agent and the reactants for preparing the alkylation agent. The present invention is quite important and useful and allows the obtaining of unobvious and unexpected results.

The nature and objects of the present invention having been completely described and illustrated and the best mode and embodiment contemplated set forth, what we wish to claim as new and useful and secure by Letters Patent is:

1. A method for producing t-butyl-m-xylene in a reaction employing isobutylene, hydrogen chloride and a m-xylene-containing fraction as the sole feed stock and wherein t-butyl chloride is the sole alkylation agent which comprises:

reacting isolbutylene with hydrogen chloride dissolved in said m-xylene containing fraction at a temperature from about 15° to about 30° C. at about 100 to 150 p.s.i. pressure to form a xylene product containing m-xylene, t-butyl chloride and free of isobutylene;

dissolving aluminum chloride in a portion of said m-xylene containing fraction;

the molar ratio of t-butyl chloride and m-xylene in said xylene product being within the range from about 0.25:1 to 1.25:1;

alkylating said xylene product under alkylation conditions at a temperature from about 20° to about 45° C. in the liquid phase in the presence of said disolved aluminum chloride to form an alkylated product containing t-butyl-m-xylene and hydrogen chloride; and recovering t-butyl-m-xylene from said alkylated product;

whereby t-butyl chloride and hydrogen chloride are produced in situ, formation of high boiling polymers of isobutylene is avoided, and production of high boiling alkyl monochlorides is reduced.

2. A methd in accordance with claim 1 in which hydrogen chloride is recovered from the alkylated product and reacted with said isobutylene employed as a feed stock.

References Cited

UNITED STATES PATENTS 2,883,438   4/1959   Egbert _____ 260—671

FOREIGN PATENTS 28,147   7/1907   Great Britain.

DELBERT E. GANTZ, Primary Examiner.

C. R. DAVIS, Assistant Examiner.